United States Patent
Goel et al.

(10) Patent No.: US 8,832,187 B2
(45) Date of Patent: Sep. 9, 2014

(54) SYSTEM AND METHOD FOR PROVIDING CHAT-BASED CRISIS MANAGEMENT SERVICES

(75) Inventors: Nikhil Goel, Irving, TX (US); Bipin Sakamuri, Irving, TX (US); Amit Singh, Irving, TX (US); Dinyar Kavouspour, Plano, TX (US); Fari Ebrahimi, Basking Ridge, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1069 days.

(21) Appl. No.: 12/469,964

(22) Filed: May 21, 2009

(65) Prior Publication Data
US 2010/0296641 A1 Nov. 25, 2010

(51) Int. Cl.
*G06F 15/16* (2006.01)
*H04M 11/04* (2006.01)
*H04M 11/00* (2006.01)
*G06Q 10/00* (2012.01)

(52) U.S. Cl.
USPC .......... 709/204; 709/229; 379/37; 379/93.21; 705/1.1

(58) Field of Classification Search
None
See application file for complete search history.

(56) References Cited

U.S. PATENT DOCUMENTS

| | | | |
|---|---|---|---|
| 7,707,227 B2 * | 4/2010 | Shibata | 707/802 |
| 2008/0037763 A1 * | 2/2008 | Shaffer et al. | 379/266.01 |
| 2008/0189162 A1 * | 8/2008 | Ganong et al. | 705/9 |
| 2008/0208605 A1 * | 8/2008 | Sinha et al. | 705/1 |
| 2009/0327882 A1 * | 12/2009 | Velusamy | 715/269 |
| 2011/0255670 A1 * | 10/2011 | Seidberg et al. | 379/45 |

OTHER PUBLICATIONS

Kalt, "RFC 2813", 2000.*

* cited by examiner

*Primary Examiner* — Wen-Tai Lin

(57) ABSTRACT

An approach is provided for chat-based crisis management services. A crisis situation is recognized based on one or more events. Individuals needed for crisis management are identified and a bridge communication channel for a plurality of the identified individuals is facilitated. Data is shared among the identified individuals that participate in a chat session on the bridged communication channel. Dated exchanged among the participants is stored during the chat session. Access to the stored chat data is provided to the participants.

23 Claims, 6 Drawing Sheets

SYSTEM AND METHOD FOR PROVIDING CHAT-BASED CRISIS MANAGEMENT SERVICES

BACKGROUND INFORMATION

With the advent of computers, interactive electronic communications, and the Internet, as well as advances in the realm of digital information, has come a reinvention of conventional techniques for crisis management. Traditionally, crisis management services have been facilitated through telephony conference bridges, whereby participants are paged to join a telephony bridge in order to resolve any detected "crisis situation." Unfortunately, these conventional approaches have proven to be inefficient and expensive, as they are typically constrained by legacy infrastructures and corresponding technologies. With readily available, cost-effective broadband services and reductions in cost of computing equipment, mobile devices, and the like, new more advanced techniques for crisis management services are desired.

Furthermore, telecommunication service providers are finding it increasingly more challenging to leverage their existing resources. Yet, as increasing numbers of individuals migrate from the use of traditional communications based technologies to synergistic multimedia platforms, traditional telecommunications service providers are being challenged to develop new services and features in order to remain competitive, as well as develop fresh sources of revenue to support their aging infrastructures.

Therefore, there is a need for an approach that provides more effective and convenient techniques to providing instant communication-based crisis management services that also enable telecommunication service providers to generate new sources of revenue.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing chat-based crisis management services are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to chat or instant messaging applications, it is contemplated that exemplary embodiments have applicability to other equivalent application channels.

Figure 1:
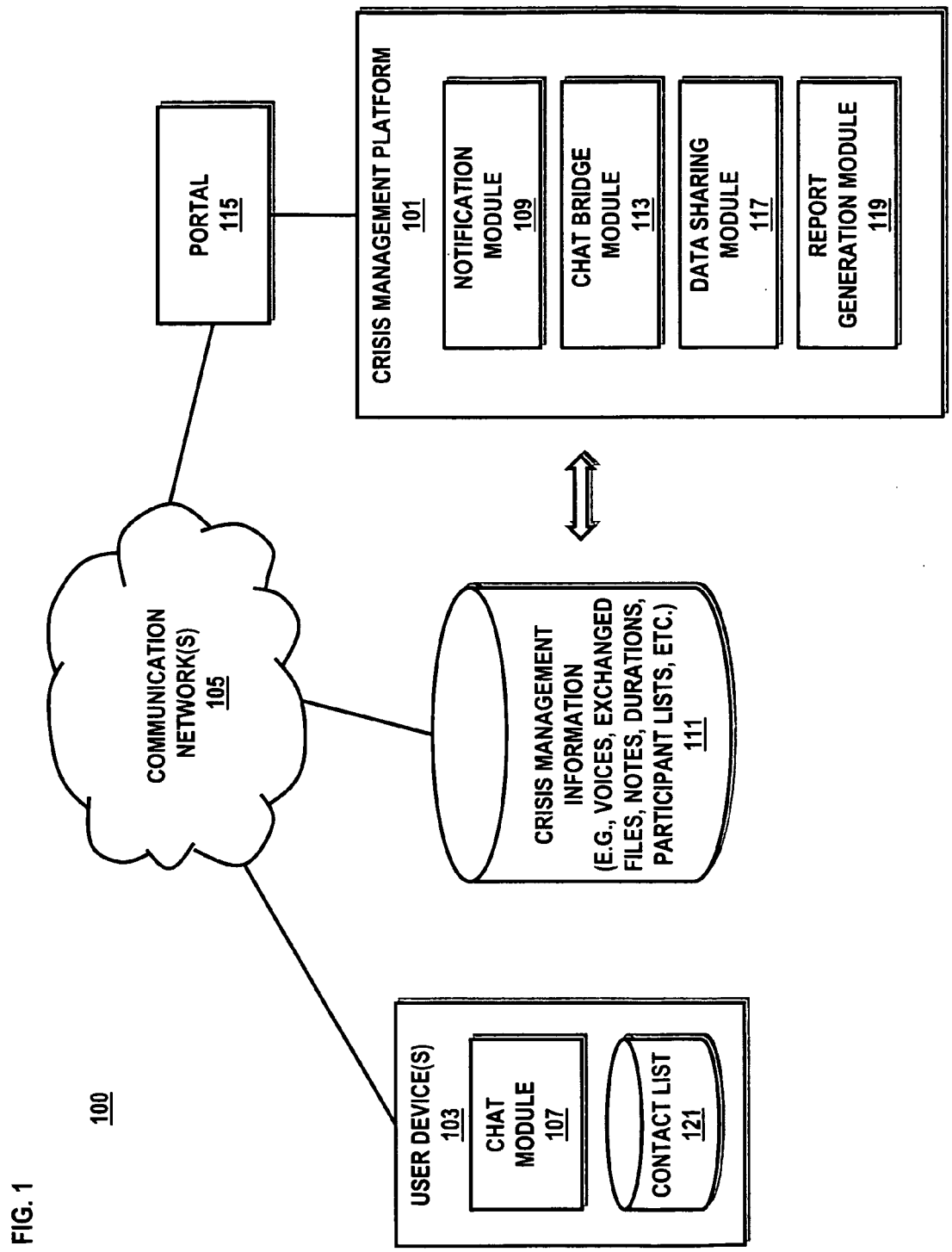
FIG. 1 is a diagram of a system capable of providing chat-based crisis management services, according to an exemplary embodiment.

FIG. 1 is a diagram of a system capable of providing chat-based crisis management services, according to an exemplary embodiment. For the purpose of illustration, system 100 is described with respect to crisis management platform 101 configured to recognize crisis situations, identify individuals needed for crisis management, and invite identified individuals to participate in crisis resolution communications. The identification of a crisis situation, according to one embodiment, can involve any number of events and rules relating to those events; by way of example, the rules can govern service availability of critical network functions, and can be defined depending on the application or service. To this end, crisis management platform 101 is further configured to facilitate instant messaging, instant communications, (or chat) based bridged communication channels for hosting crisis resolution communications among one or more individuals (or participants) at one or more user devices 103 via one or more communication networks 105. In exemplary embodiments, crisis management platform 101 is also configured to support information exchange via the bridged chat-based communication channels, as well as store and track information associated with these crisis situations. As such, user devices 103 are equipped with chat modules 107 for executing one or more IM applications (or clients) for joining bridged chat-based communication channels. In other instances, crisis management platform 101 may be utilized to generate and disseminate reports concerning the crisis situations or information associated therewith, such as information or communications exchanged between endpoints. While specific reference will be made hereto, it is contemplated that system 100 may embody many forms and include multiple and/or alternative components and facilities.

It is recognized that crisis management is an integral part of many businesses, governments, organizations, institutions, etc., that provide systems, services, products, information, and the like, for areas, such as education, production, supply, maintenance, safety, investing, transportation, and the like. For instance, crisis management systems may be implemented by businesses to ensure that when catastrophic events occur (e.g., a manufacturing plant becomes unavailable), necessary participants for resolving the issue may identified, contacted, and informed of the situation so that the crisis may be resolved in a timely manner.

As previously noted, traditional crisis management systems implement telephony conference bridges, whereby necessary participants for resolving identified crisis situations are paged or electronically mailed to join established telephony conference bridges. These approaches suffer from several inefficiencies, such as delays in participants "actually" being notified to join an established telephony bridge for resolving an identified crisis situation. That is, crisis management systems confined to paging and electronically mailing notifications suffer from situations when participants are unable to receive their notifications because, for example, those participants do not have their pagers or they are unable to receive electronic mail. Hence, paging or electronically mailing participants are not always the best mode of contacting participants and, thus, these participants may be slow to joining the telephony conference bridge.

Another issue involves situations when new participants actually do join telephony conference bridges and then information concerning the crisis must be consistently repeated to these participants to bring them "up-to-speed" on the developing situation. As such, informing newly joined participants can consume an inordinate amount of valuable time that would otherwise be devoted to resolving the crisis situation. Furthermore, conversations over the telephony bridge are not stored and, as such, cannot serve as a resource for later analysis or for resolving similar situations. Typically, the notes of a telephony bridge facilitator are generally all that are available for later review; however, these notes are subject to varying interpretations and usually omit otherwise helpful information that the facilitator deemed unimportant.

The aforementioned issues exemplify other prevailing issues, such as that legacy crisis management systems only permit voice as the input/output medium. In this manner, when attempting to exchange information during a bridged telephony conference, participants must either verbally convey the information or else be prevented from sharing the data. Moreover, there is no efficient manner to track information that is actually exchanged, as well as no efficient manner to ensure that the exchanged information is the most "up-to-date." Along these lines, telephony conferences do not lend themselves to effective report generation. Namely, to achieve effective operations maintenance, as well as improvements thereon, it is critical that vital parameters are captured, stored, and utilized to generate and disseminate reports associated with the crisis situations. These parameters may include information, such as invited participants, participant profiles, time to join after notification, referenced files (e.g., text documents, images, etc.), communication bridge duration, history of participants joining and/or exiting the communication bridge, and the like. Moreover, crisis management systems facilitated via legacy infrastructures provide one of the more expensive modes of communication. That is, there exist substantial costs in owning, operating, and maintaining dedicated telephony conference bridges for crisis management and, as such, companies are generally limited to only being able to invest in a restricted number of dedicated bridges. Still further, bridge facilitators are typically unable to multitask even though these individuals may be idle for an extended portion of the telephony bridged communications. Hence, legacy crisis management systems utilizing telephony conference bridges do not effectively utilize bridge facilitators and, as a result, may cause overstaffing issues that, in turn, causes additional cost expenditures.

Therefore, the approach of system 100 according to certain exemplary embodiments stems from the recognition that providing chat-based bridged communication channels for supporting crisis resolution are critical to improving the manner in which bridged communication channels are managed and operated, as well as improving cost expenditures related to crisis management. In this manner, by providing chat-based communication channels, system 100 may provide notifications via various automated modes of communication, such as telephony dialing with prerecorded calls, call forwarding, electronic mail distribution, paging, text messaging, leaving voicemails, facsimile placement, and the like, as well as multiple points of contact, e.g., telephony devices, wireless devices, computing devices, and the like. Other exemplary embodiments stem from the recognition that providing digitized modes of communication enables system 100 to store, update, and archive bridged communications, as well support data exchange over the digitized communication channels. In turn, these digitized communication channels enable system 100 to capture, store, and analyze information related to crisis situations for generating and disseminating reports to crisis management participants. These reports may also be utilized to bring participants newly joining a bridged communication channel "up-to-speed" on the crisis situations. Furthermore, given the vast resources of digital infrastructures, e.g., the Internet, these digitized communication channels are, for all practical intensive purposes, unlimited. As such, these bridges can be allocated on-demand at a fraction of the costs associated with dedicated telephony conference bridges. Moreover, chat-based communication channels that can be monitored in automated manners enable bridge facilitators to multitask.

According to exemplary embodiments, crisis management platform 101 may be configured to recognize (via, for example, notification module 109) a crisis situation (e.g., network outage, security breach, manufacturing defects, supply chain failures, etc.) and identify individuals needed for crisis management. It is generally noted that crisis situations may be identified by notification module 109 based on participant input, monitored conditions, and/or correlations with one or more specified criteria, such as one or more threshold parameters or range of threshold parameters. As such, when conditions exhibit specified relationships constituting predefined crisis situations, notification module 109 may be configured to generate one or more customized invitations for transmission to user devices 103 based on, for example, information (e.g., user profiles) stored to, for example, crisis management repository 111. In this manner, identified individuals may be notified via one or more initiations inviting them to join a chat-based bridged communication channel and, thereby, participate in chat-based crisis resolution. It is noted that, in certain embodiments, notifications may include, among other crisis management information, synopsis information associated with a recognized crisis situation and a chat-based bridged communication channel number identifying an existing chat-based bridged communication channel devoted to crisis resolutions, as well as other suitable crisis management information, such as assigned duties, positional authorities, tasks, etc., all of which may be stored to crisis management information repository 111 or any other suitable storage location (or memory) of or available to system 100.

In certain implementations, notifications including invitations may be transmitted (or otherwise conveyed) to individuals at one or more user devices 103 over one or more communication networks 105. The notifications may be generated in an automated manner and, thereby, may include (or entail) contacting individuals via one or more modes of communication, such as electronic mail messages, facsimiles, instant messages, multimedia messages, pages, prerecorded telephony communications, short messages, text messages, and voicemails, as well as any other suitable form of communication. It is noted that notification module 109 may attempt to contact identified individuals via one or more modes of communication based one or more policies stored to, for example, crisis management information repository 111. In this manner, notifications are more likely to be received and perceived by identified individuals as multiple avenues of communication can be implemented, as well as iterated.

According to one implementation, notification module 109 may attempt to notify a particular identified individual by transmitting a short message to a user device 103, such as a cellular phone, associated with the particular individual. To this end, the short message may include a bridged communication channel number identifying an existing chat-based bridged communication channel for crisis resolution. Notification module 109 may also attempt to establish an automated voice session (e.g., automated phone call) to the user device 103, wherein if the particular individual completes the automated voice session (e.g., "answers" the automated phone call), notification module 109 may relay, among other things, the bridged communication channel number in a prerecorded or machine generated message. If, however, the voice session is not completed (e.g., the particular individual does not "answer" the automated phone call), notification module 109 may otherwise leave a voicemail message. Further, notification module 109 may electronically mail and page the identified individual, as well as attempt to contact the identified individual via one or more of the other aforementioned modes of communication.

Chat bridge module 113 may be provided for identifying unassigned bridge numbers, as well as establishing chat-based bridged communication channels based on particular ones of the unassigned bridge numbers. In various embodiments, chat bridge module 113 may employ one or more instant communication client protocols, such as an extensible messaging and presence protocol (XMPP), a session initiating protocol (SIP), a session initiation protocol for instant messaging and presence leveraging extensions (SIMPLE), and/or any other suitable protocol, for establishing the chat-based bridged communication channels. It is noted that chat bridge module 113 may facilitate interaction between disparate modes of communication, such as between one or more participants utilizing voice as an input/output medium and one or more participants utilizing text messages and an input/output medium. As such, chat bridge module 113 may include (or have access to the functions of) one or more automated speech recognition and text-to-speech engines for translating between and conveying appropriate modes of communication to corresponding participant individuals. It is noted that chat bridge module 113 may utilized crisis management information, such as mode of communication information, stored to crisis management information repository 111 for determining which mode of communication is most appropriate for a particular participant.

To enhance participant experiences, system 100 utilizes a portal 115 to help the process of joining individuals to established chat-based communication channels, as well as uploading, downloading, modifying, customizing, etc., the various forms of crisis management information. For example, portal 115 may provide one or more graphical user interfaces to enable individuals at user devices 103 to access, input, update, and/or maintain one or more user profiles that specify, for example, notification (or contact) information. For instance, individuals may input, update, and/or maintain various modes of contact (e.g., electronic mail messages, facsimiles, instant messages, multimedia messages, pages, prerecorded telephony communications, short messages, text messages, voicemails, etc.), addresses for contact (e.g., telephony numbers, bubby names, internet protocol addresses, electronic mail addresses, and the like), notification forwarding policies, and the like, as well as other personal information that might otherwise facilitate identifying individuals needed for crisis management, such as special skills, geographic location, working schedule, affiliations, etc. In other instances, portal 115 may provide one or more graphical user interfaces for participant individuals, via user devices 103, to upload, download, or modify crisis management information, as well as access one or more of the other functions provided by crisis management platform 101, such as requesting and receiving crisis management reports.

Accordingly, crisis management platform 101 includes, in exemplary embodiments, data sharing module 117, that is configured to consolidate, converge, and store crisis management information (or data) exchanged among and between participants of the chat-based communication sessions. In other instances, data sharing module 117 may monitor chat-based bridge communication channels and/or participants thereof, for logging information corresponding to crisis resolution, which is explained in more detail in accordance with FIGS. 4 and 5. These various forms of crisis management information may be stored to crisis management information repository 111 or any other suitable storage location (or memory) of or available to system 100, such as a memory (not shown) of user devices 103 or crisis management platform 101. To this end, crisis management platform 101 may also include report generation module 119 for extracting information from crisis management information repository 111 and generating various crisis management reports. As noted, an exemplary process for logging and exchanging data is described with reference to FIG. 4. Exemplary crisis management information and report generation are explained in more detail in accordance with FIG. 5.

According to particular embodiments, crisis management platform 101 may be configured to receive report requests from user devices 103 for generating reports based on crisis management information and/or participant specified report generation criteria. As such, report generation module 119 may be configured to generate reports in response to the report requests, as well as based on the criteria specified in the report requests. In other instances, the criteria may have been previously specified by participants and, thereby, stored to, for example, crisis management repository 111. Reports may include various audio (e.g., sounds, "ear-cons" (i.e., audio icons), voices, etc.), visual (e.g., charts, graphs, suggestions, textual explanations, warnings, etc.), and/or haptic (e.g., tactile feedback, etc.) information. It is noted that reports may be conveyed to participants in via any suitable mode of communication, e.g., electronic mailing, facsimile transmission, instant communication, multimedia message, postal mailing, short message, voice call, etc., as well as combinations thereof. In other embodiments, reports may be made available to participants at user devices 103 via a networked application (e.g., website). For instance, a report may be "viewed" or "downloaded" by an individual via an online graphical user interface (GUI) hosted by, for example, portal 115. That is, portal 115 may be configured to provide networked access to generated reports and/or configurable variables of report generator module 119. As such, crisis management platform 101 can provide crisis management participants with a common set of networked applications for resolving crisis situations.

While not illustrated, crisis management platform 101 may implement or have access to a presence service module for determining individuals available for crisis resolution or participants "currently" joined (or not joined) to established chat-based bridged communication channels. Because of the immediate or instant nature of the communication, chat bridge module 113 may also utilize this presence information or availability of participants for facilitating the exchange of information over a chat-based bridged communication channel. In this manner, user devices 103, via chat modules 107 and/or one or more contact (or "buddy") lists 121, may transmit and view presence information (e.g., presence messages) over one or more communication networks 105 to indicate and perceive availability states of user devices 103 and, thereby, of the participant individuals.

Accordingly, the various automated features of crisis management platform 101, portal 115, and user devices 103 enable the number of bridge facilitators to be reduced, as individual bridge facilitators can multitask, which is not provided by conventional crisis management telephony systems. The same is true for participant individuals. Namely, since information may logged and reviewed, participant individuals may participate in multiple chat-based bridged communication channels at once. Thus, participant individuals may make themselves more available to solving crisis situations.

It is noted that communication networks 105 may be any suitable wireline, wireless, or combination thereof network. For example, communication networks 105 may include one or more telephony networks, such as a circuit-switched network, e.g., the public switched telephone network (PSTN), an integrated services digital network (ISDN), a private branch exchange (PBX), or other like network. Communication networks 105 may employ various wireless access technologies including, for example, code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE), wireless fidelity (WiFi), satellite, and the like. In other instances, communication networks may include a data network, such as any local area network (LAN), metropolitan area network (MAN), wide area network (WAN), the Internet, or any other suitable packet-switched network, such as a commercially owned, proprietary packet-switched network having voice over internet protocol (VoIP) capabilities, e.g., a proprietary cable or fiber-optic network. It is further contemplated that communication networks 105 may include components and facilities to provide for signaling and/or bearer communications between the various components or facilities of system 100. In this manner, communication networks 105 may embody or include portions of a signaling system 7 (SS7) network, or other suitable infrastructure to support control and signaling functions.

Accordingly, user devices 103 may include any customer premise equipment (CPE) capable of sending and/or receiving one or more forms of the aforementioned modes of communication (e.g., instant messages), as well as send and receive information (e.g., crisis management data files) over one or more of communication networks 105. For instance, user devices 103 may include functionality for voice-based or telephony-based communications, such as those functions employed by suitable plain old telephone service (POTS) devices, facsimile machines, and the like. User devices 105 may employ mobile (or otherwise wireless) functions, such as included in cellular phones, radiophones, satellite phones, smart phones, wireless phones, or any other suitable mobile device, such as personal digital assistants (PDA), pocket personal computers, tablets, customized hardware, etc. Further, user devices 103 may include computing devices functions, such as implemented by any suitable computing device, e.g., VoIP phones, skinny client control protocol (SCCP) phones, session initiation protocol (SIP) phones, IP phones, personal computers, softphones, workstations, terminals, servers, and the like.

It is noted that user devices 103 may include one or more components for extending chat-based communications to participants. In this manner, user devices 105 include chat modules 107 and/or any other suitable client programs that operate thereon for providing access to the various services of system 100, such as providing access to bridged chat-based communication channels that are facilitated by crisis management platform 101 and/or portal 115. It is contemplated; however, that chat modules 107 (or the other client programs) may be executed via crisis management platform 101 (or portal 115) and, thereby, made accessible to participants via user devices 103. In this way, chat modules 107 may provide one or more user interfaces, e.g., graphical user interfaces (GUI), configured to interact with the various services (or functions) of system 100. Additionally, the user interfaces may be configured to facilitate the acquisitioning, exchanging, managing, sharing, storing, and updating of crisis management information stored to, for example, crisis management information repository 111.

It is further noted that crisis management repository 111 may be maintained by a service provider of crisis management platform 101 or by any suitable third-party. It is also contemplated that the physical implementation of repository 111 may take many forms, including, for example, portions of existing repositories of a service provider, new repositories of a service provider, third-party repositories, and/or shared-repositories. As such, repository 111 may be configured for communication over system 100 (e.g., over communication networks 105) through any suitable messaging protocol, such as lightweight directory access protocol (LDAP), extensible markup language (XML), open database connectivity (ODBC), structured query language (SQL), Configuration Access Protocol (CAP) and the like, as well as combinations thereof. In those instances when repository 111 is provided in a distributed fashion, information and content available via repository 111 may be located utilizing any suitable querying technique, such as electronic number matching, distributed universal number discovery (DUNDi), uniform resource identifiers (URI), etc.

Figure 2:
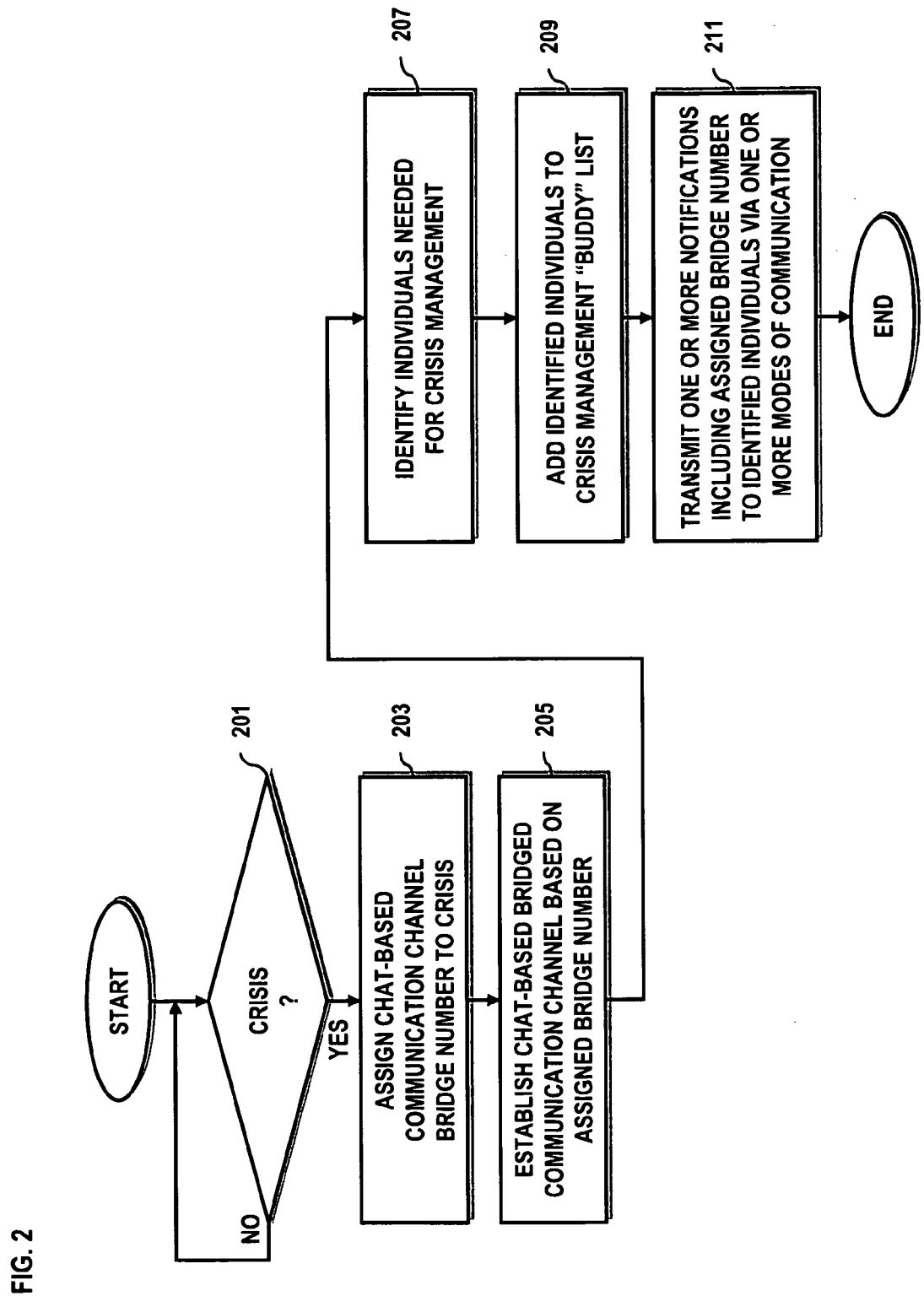
FIG. 2 is a flowchart of a process for transmitting notifications to one or more individuals needed for crisis management, according to an exemplary embodiment.

FIG. 2 is a flowchart of a process for transmitting notifications to one or more individuals needed for crisis management, according to an exemplary embodiment. For illustrative purposes, the process is described with respect to FIG. 1. It is noted that the steps of the process may be performed in any suitable order, as well as combined or separated in any suitable manner. At step 201, crisis management platform 101 (via, for example, notification module 109) determines (or otherwise identifies) that a crisis situation exists base on one or more events. It is noted that the events can be defined by the service provider, as they relate to the services provided to customers (or subscribers). If there is no crisis situation, then notification module 109 continues to monitor for such occurrences. If, however, a crisis situation is identified, then chat bridge module 113 assigns a chat-based bridged communication channel number to the identified crisis situation, per step 203. In step 205, chat bridge module 113 establishes a chat-based bridged communication channel based on the assigned bridged number. Accordingly, notification module 109 may identify one or more individuals needed for crisis management, at step 207. This may be performed based on the identified crisis, as well as one or more parameters stored to crisis management repository 111, such as user profile information relating to candidate participants. In step 209, the identified individuals are added to a crisis management "buddy" list, which may be utilized to track and store various crisis management parameters relating to both the identified crisis, as well as the identified participants. Various forms of crisis management information that may be tracked and stored are explained in more detail in accordance with FIG. 5. Per step 211, notification module 109 may transmits one or more notifications (including, among other information, the assigned bridge number) to identified individuals via one or more of the various modes of communication, which may be performed based on information (e.g., user profile information) stored to, for example, crisis management information repository 111.

Consequently, once identified individuals receive and perceive at least one of the transmitted notifications including an invitation to join the chat-based bridged communication channel established according to the assigned bridge number, the identified individuals may join the chat-based bridged communication channel.

Figure 3B:
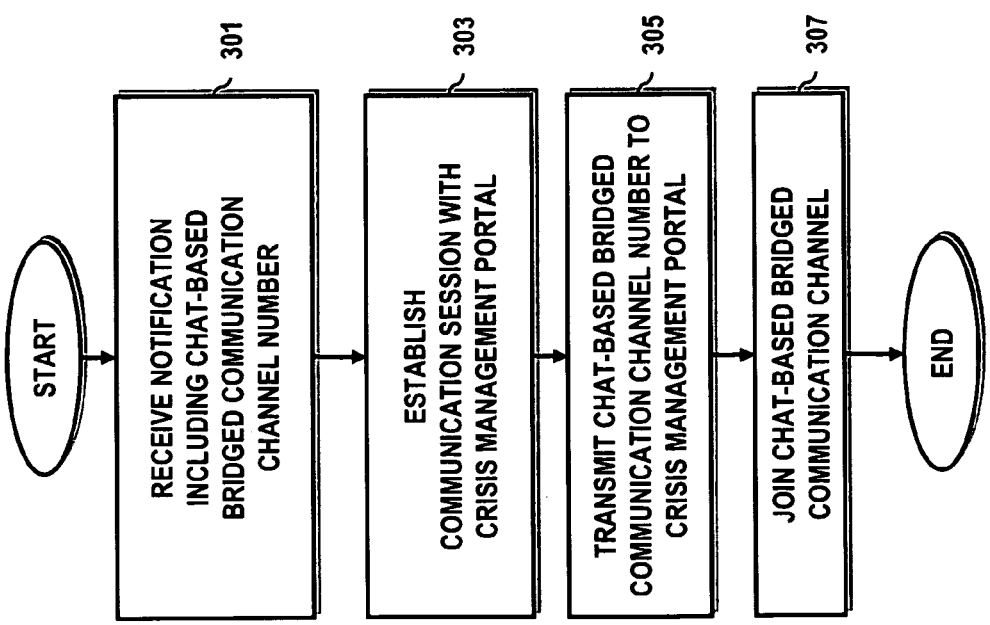
FIGS. 3A and 3B are flowcharts of processes for joining and coupling individuals to established chat-based bridged communication channels, according to exemplary embodiments.
Figure 3A:
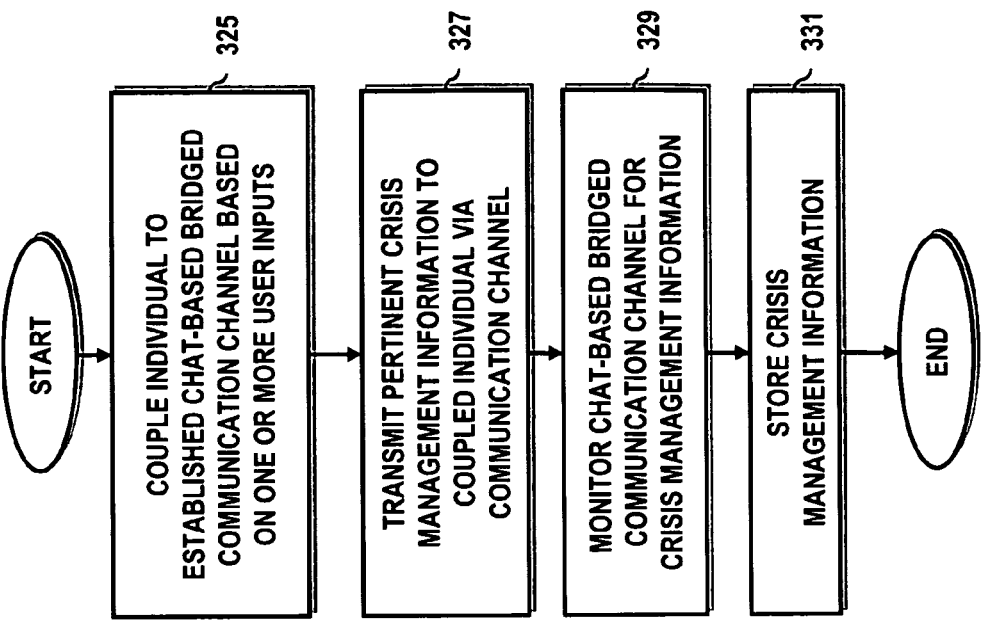

FIG. 3A is a flowchart of a process for joining an established chat-based bridged communication channel, according to an exemplary embodiment. For illustrative purposes, the process is described with respect to FIG. 1. It is noted that the steps of the process may be performed in any suitable order, as well as combined or separated in any suitable manner. In step 301, an individual receives, at user device 103, a notification including, among other information, a chat-based bridged communication channel number. In this manner, user device 103 may establish (per step 303) a communication session with crisis management portal 115 based on one or more inputs provided by the individual. As previously mentioned, portal 115 provides individuals with an interface (e.g., graphical user interface) for entering received bridge numbers for joining established chat-based bridged communication channels for resolving identified crisis situations. In step 305, user device 103 transmits, based on one or more additional user inputs, the chat-based bridged communication channel number to crisis management portal 115. According to certain embodiments, portal 115 may identify the individual associated with the established communication session, such as via a machine access number, username and password combination, or other authorization/identification technique, which may enable portal 115 to automatically retrieve the corresponding bridge number from, for example, chat bridge module 113, user device 103, crisis management information repository 111, etc., without requiring the individual to input the bridge number. In any case, at step 307, portal 115 joins user device 103 to the chat-based bridged communication channel corresponding to the bridge number. Once the individual is "joined" to the chat-based communication channel, the individual will be able to review previously exchanged instant messages, exchanged files, stored data, crisis synopsis information, and the like, such as via one or more graphical user interfaces provided by portal 115 and/or chat module 107.

FIG. 3B is a flowchart of a process for coupling an individual to an established chat-based bridged communication channel, according to an exemplary embodiment. For illustrative purposes, the process is described with respect to FIG. 1. It is noted that the steps of the process may be performed in any suitable order, as well as combined or separated in any suitable manner. At step 325, chat bridge module 113 joins (or otherwise couples) an individual to an established chat-based bridged communication channel based on one or more user inputs, such as a bridge number input to a graphical user interface of portal 115. In step 327, data sharing module 117 transmits pertinent crisis management information to the newly joined individual via the established chat-based bridged communication channel. This "pertinent" information may include a synopsis of a "then existing" state of the identified crisis situation, a "buddy" list associated with the crisis situation, a log of previously exchanged instant messages between participants, a log of previously exchanged data among the participants, a record of the chat-based communication session, and presence information associated with individuals included on the "buddy" list, as well as any other suitable crisis management information that may aid the newly joined individual in getting "up-to-speed" on the crisis situation. As such, bridge facilitators need not halt crisis resolution communications to bring the newly joined individual "up-to-speed" and, thereby, valuable crisis resolution time is not otherwise needlessly diminished. Furthermore, per step 329, chat-bridge module 113 may monitor the established chat-based bridged communication channel for various crisis management information, such as joining and dispatching times of participants, lifetime of chat-based communication channel, uploaded data and associated times, downloaded data and associated times, participant names, communication modes for participating individuals, bridge facilitator notes, presence information, and the like. Thus, in step 331, this crisis management information may be stored to any suitable storage location of (or available to) system 100, such as crisis management information repository 111.

Figure 4:
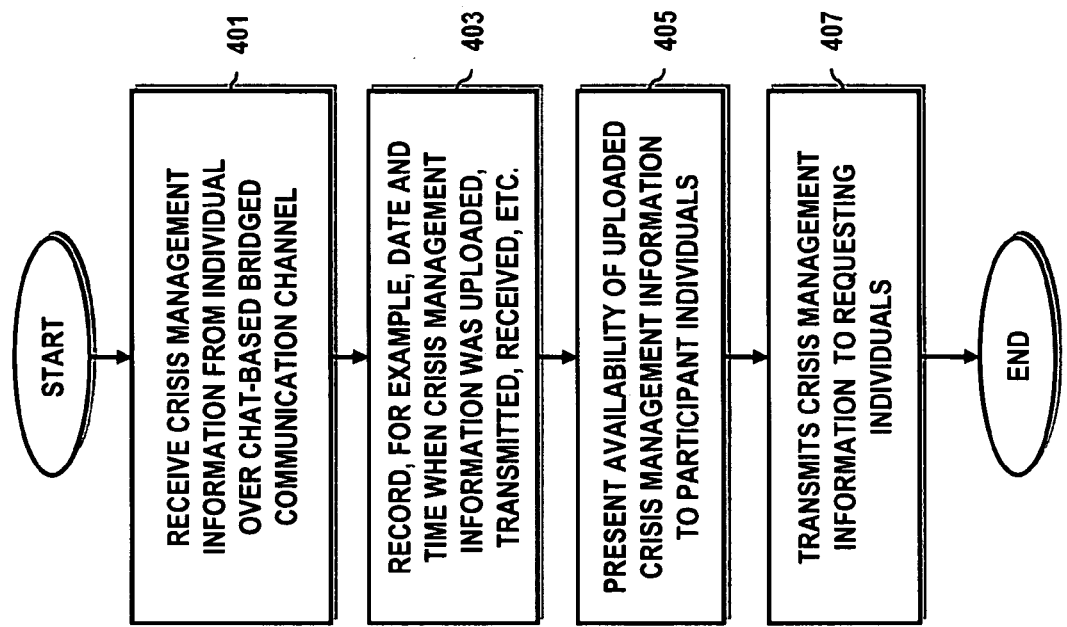
FIG. 4 is a flowchart of a process for exchanging information via an established chat-based bridged communication channel, according to an exemplary embodiment.

Accordingly, during the course of crisis management communications, participants may desire to exchange information, such as data files, images, videos, etc., associated with resolving the identified crisis situation. FIG. 4 is a flowchart of a process for exchanging information via an established chat-based bridged communication channel, according to an exemplary embodiment. For illustrative purposes, the process is described with respect to FIG. 1. It is noted that the steps of the process may be performed in any suitable order, as well as combined or separated in any suitable manner. At step 401, data sharing module 117 receives crisis management information (e.g., data file attachments, notes, messages, etc.) from an individual over an establishing chat-based bridged communication channel. In step 403, data sharing module 117 records, for example, a date and time when the crisis management information was uploaded to crisis management platform 101, was transmitted to crisis management platform 101 from user device 103, was received by crisis management platform 101. According to exemplary embodiments, this may be based on information parsed from information included in a "header" of transmission units (e.g., blocks, cells, frames, packets, etc.) transporting the crisis management information to crisis management platform 101. Once the crisis management information is received and logged by data sharing module 117, data sharing module 117 (per step 405) may transmit an "availability indicator" to participant individuals over the chat-based bridged communication channel to indicate availability of "currently available" uploaded crisis management information. At step 407, data sharing module 117 may transmit the uploaded crisis management information to requesting participant individuals. For example, the crisis management information may relate to notes of a bridge facilitator or participant individuals or collaborative notes generated by the collective group of participant individuals and/or the bridge facilitator.

It is noted that uploaded and/or monitored crisis management information may be updated or otherwise modified by authorized participants and/or by crisis management platform 101. As such, data sharing module 117 may updated or otherwise modify "version" information to help distinguish "current" crisis management information from "stale" crisis management information. It is also noted that this crisis management information may be utilized to generate one or more reports.

Figure 5:
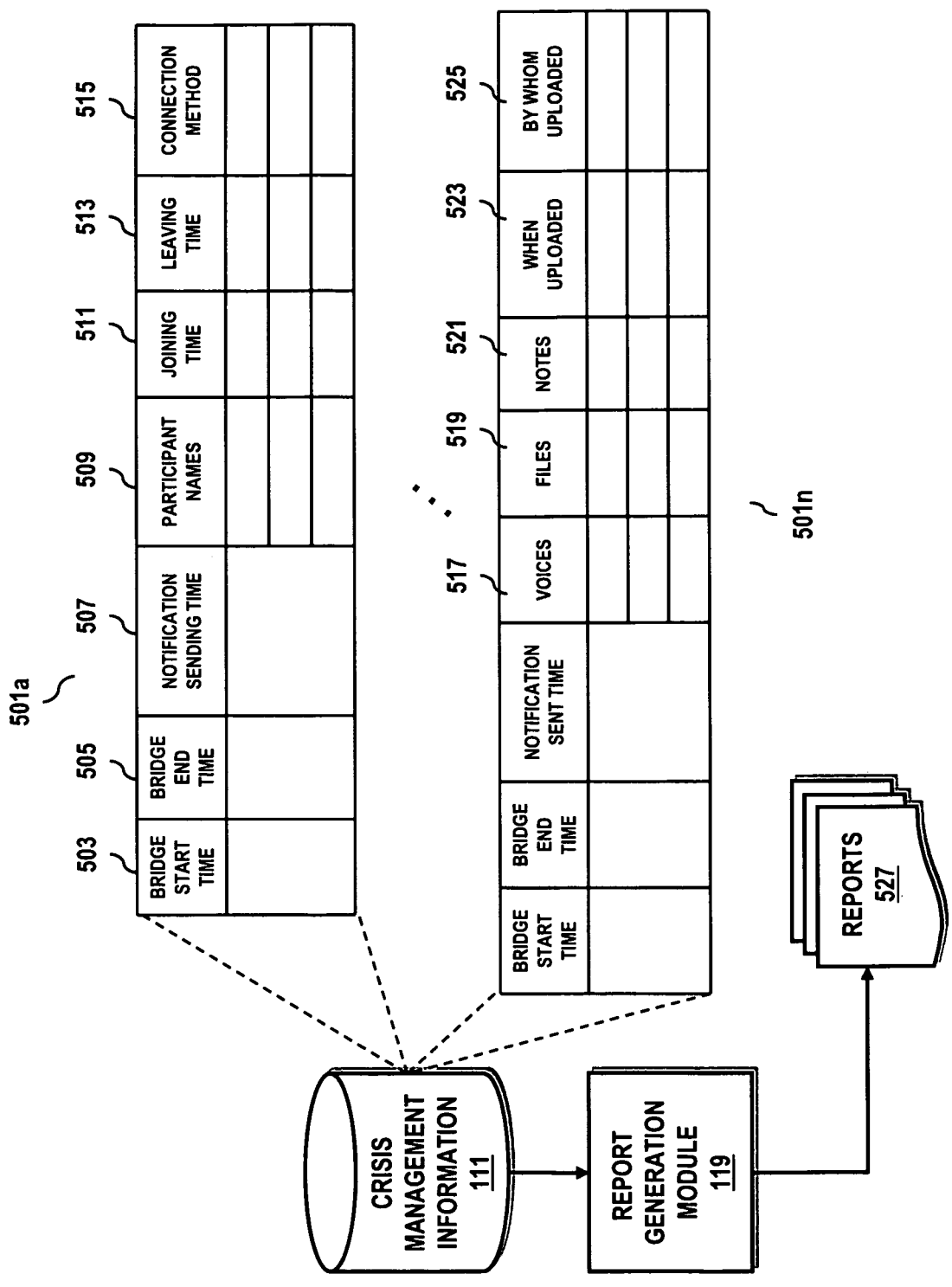
FIG. 5 is a diagram illustrating chat-based bridged communication channel data storage and report generation, according to an exemplary embodiment.

FIG. 5 is a diagram illustrating crisis management information storage and report generation, according to an exemplary embodiment. According to one particular exemplary embodiment, crisis management information repository 111 may include one or more "tables" 501a-501n (or other data storage structures) including various forms of crisis management information. For example, table 501a may provide for information relating to a chat-based bridged communication channel and/or participant individuals, such as when a chat-based bridged communication channel was established 503 and when the chat-based bridged communication channel was terminated 505. In other areas, table 501a may provide for times 507 when notifications were transmitted to particular participant individuals listed in area 509, as well as one or more times when participant individuals joined 511 and disconnected 513 from an established chat-based bridged communication channel. Table 501a may also provide an area 515 to convey corresponding modes (or methods) by which participant individuals are coupled to the chat-based bridged communication channel. Table 501n may provide other crisis management information, such as crisis management information relating to exchanged crisis management information. As such, table 501 may provide for areas identifying recorded voices 517, uploaded files 519, crisis management notes 521, and the like. Table 501n may also provide for when the various voice 517, uploaded files 519, notes 521, etc., were uploaded (and/or modified) 523, as well as by the individual participant that uploaded the voices 517, uploaded files 519, notes 521, etc. It is particularly noted that tables 501a and 501n are merely illustrative in nature and, by no means, account for the various forms and modes of crisis management information that may be stored to crisis management information repository 111. In any case, report generation module 119 may be configured to generate on or more reports 527, such as based on a request, a policy stored to crisis management information repository 111, termination of a chat-based bridged communication channel, and the like. It is noted that report generation module 119 may disseminate generated reports via one or more of the aforementioned modes of communication, such as via electronic mail messages, facsimiles, instant messages, multimedia messages, pages, prerecorded telephony communications, short messages, text messages, and voicemails, as well as any other suitable form of communication.

The processes described herein for providing chat-based crisis management services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
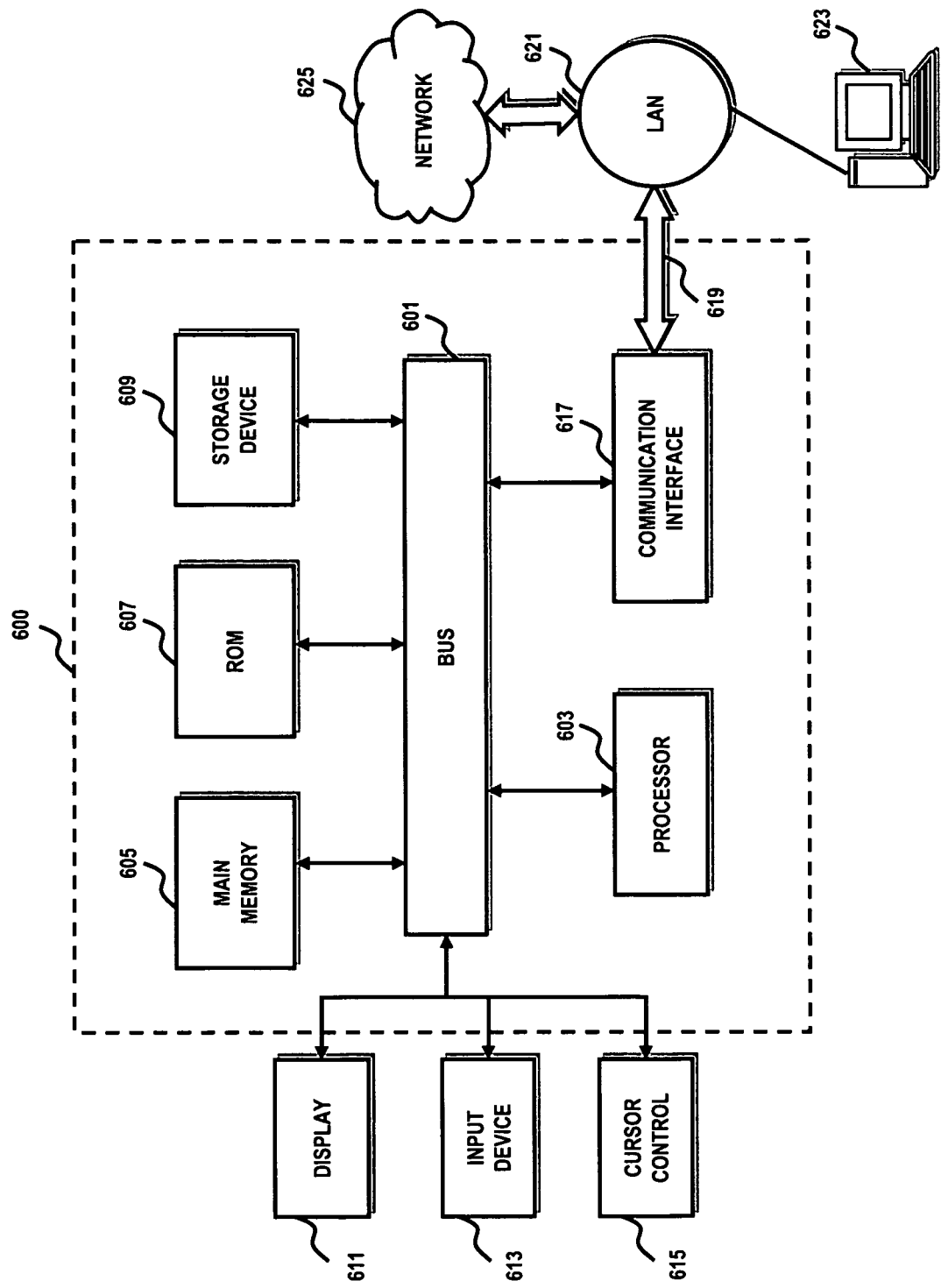
FIG. 6 is a diagram of a computer system that can be used to implement various exemplary embodiments.

FIG. 6 illustrates computing hardware (e.g., computer system) 600 upon which an embodiment according to the invention can be implemented. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   recognizing a crisis situation exists based on occurrence of one or more events defined by a service provider relating to one or more services provided to one or more customers by the service provider;
   assigning a bridged communication channel number to the crisis situation;
   establishing a bridged communication channel based on the bridged communication channel number;
   identifying individuals for resolving the crisis situation based on tracked parameters stored in a crisis management repository;
   joining a plurality of the individuals to the bridged communication channel based on the bridged communication channel number as participants of a chat session;
   sharing data exchanged among the participants through the bridged communication channel based on the bridged communication channel number; and
   storing the data exchanged among the participants based on the bridged communication channel number during the chat session.

2. A method as recited in claim 1, wherein the step of joining comprises:
   notifying the identified individuals of the crisis situation;
   inviting the notified individuals to participate in the chat session; and
   coupling the participants to the bridged communication channel the bridged communication channel number.

3. A method as recited in claim 2, wherein the step of coupling further comprises subsequently joining a new chat participant; and further comprising:
   providing a record of the chat session to all the participants during the chat session.

4. A method as recited in claim 2, wherein the step of identifying comprises creating a plurality of contact points for the identified individuals, and the step of notifying comprises initiating a plurality of modes of communication.

5. A method as recited in claim 4, wherein the step of notifying comprises generating automated text messages.

6. A method as recited in claim 4, wherein the step of notifying comprises automatically dialing and transmitting prerecorded voice messages.

7. A method as recited in claim 1, wherein the data comprises participant chat conversation data.

8. A method as recited in claim 7, further comprising transmitting data files as attachments during the chat session, wherein the data further includes the data file attachments.

9. A method as recited in claim 1, further comprising:
   storing information relating to the participants and respective time frames spent in participation.

10. A method as recited in claim 1, further comprising:
    automatically generating a report of chat session events from the stored data.

11. A method as recited in claim 10, wherein the report comprises identification of individuals notified, times of notification of the notified individuals, and times at which the participants joined and left the chat session.

12. A method as recited in claim 10, further comprising sending the report to each new participant upon joining the chat session.

13. A method as recited in claim 1, wherein the assigning of the bridged communication channel number is based on channel commitment, the crisis situation, the identified individuals, mode of communication information, or a combination thereof.

14. A method as recited in claim 1, further comprising:
    recognizing a new crisis situation;
    determining that a chat session bridge system application is available; and
    generating a separate bridged communication channel for concurrent chat session operation.

15. A system comprising:
    a crisis management portal interfaced with a communication network;
    a chat bridge management platform coupled to the crisis management portal;

a notification system; and storage media;

wherein the notification system is configured to recognize a crisis situation exists based on occurrence of one or more events defined by a service provider relating to one or more services provided to one or more customers by the service provider, assign a bridged communication channel number to the crisis situation, establish a bridged communication channel based on the bridged communication channel number, and identify individuals for resolving the crisis situation based on tracked parameters stored in a crisis management repository, the chat bridge management platform is configured to join a plurality of the one or more individuals to the bridged communication channel based on the bridged communication channel number as participants for a chat session, and share data exchanged among the participants through the bridged communication channel based on the bridged communication channel number via the crisis management portal, and the storage media is configured to store the data exchanged among the participants based on the bridged communication channel number during the chat session.

16. A system as recited in claim 15, wherein the notification system is further configured to assign the bridged communication channel number based on channel commitment, the crisis situation, the identified individuals, mode of communication information, or combination thereof.

17. A system as recited in claim 15, further comprising a data sharing platform configured to provide a record to the participants of the data exchanged.

18. A system as recited in claim 15, further comprising a report generator platform configured to generate a report of chat session events from the data exchanged.

19. A system as recited in claim 18, wherein the report comprises identification of individuals notified, times of notification of the notified individuals, and times at which the participants joined and left the chat session.

20. A system as recited in claim 18, wherein the report generator platform is further configured to send the report to each new participant upon joining the chat session.

21. A system as recited in claim 15, wherein the notification system is further configured to transmit an invitation to a newly identified individual to join the chat session already in progress; and the chat bridge management platform is further configured to facilitate bridged connection of the chat session to the newly identified individual.

22. A system as recited in claim 15, wherein the notification system is configured to generate automated text message invitations to the individuals.

23. A system as recited in claim 15, wherein the notification system is configured to automatically dial and transmit prerecorded voice message invitations to the individuals.

* * * * *